US009467719B2

(12) United States Patent
Cognault et al.

(10) Patent No.: US 9,467,719 B2
(45) Date of Patent: Oct. 11, 2016

(54) SYSTEM AND METHOD FOR THE TRANSMISSION OF DATA AND STREAMS CONTAINING VIDEO DATA $D_{video}$ IN A CHANNEL WITH GIVEN BITRATE

(71) Applicant: FRANCE BREVETS, Paris (FR)

(72) Inventors: Marc Cognault, Thorigne-Fouillard (FR); Jean-Pierre Mosset, Chateaugiron (FR); Franck Le Mouel, Erce Pres Liffre (FR)

(73) Assignee: HARMONIC INC., San Jose, CA (US)

( * ) Notice: Subject to any disclaimer, the term of this patent is extended or adjusted under 35 U.S.C. 154(b) by 121 days.

(21) Appl. No.: 14/338,591

(22) Filed: Jul. 23, 2014

(65) Prior Publication Data

US 2015/0029842 A1    Jan. 29, 2015

(30) Foreign Application Priority Data

Jul. 24, 2013 (FR) ...................................... 13 57281

(51) Int. Cl.
*H04N 21/00* (2011.01)
*H04N 21/236* (2011.01)
(Continued)

(52) U.S. Cl.
CPC .............. *H04N 21/236* (2013.01); *H04L 5/00* (2013.01); *H04L 47/25* (2013.01); *H04L 65/4069* (2013.01); *H04L 65/607* (2013.01); *H04N 21/23655* (2013.01)

(58) Field of Classification Search
CPC ..... H04L 47/25; H04L 5/00; H04L 65/4069; H04L 65/607; H04N 21/236; H04N 21/23655
USPC ............. 370/230, 232, 253, 395.43, 395.61, 370/395.65, 413, 465–467; 709/223–224, 709/231–233; 375/240.05, 243, 246
See application file for complete search history.

(56) References Cited

U.S. PATENT DOCUMENTS

| 5,159,447 A | * | 10/1992 | Haskell | ................. | H04J 3/1688 |
| | | | | | 375/240.05 |
| 5,541,919 A | * | 7/1996 | Yong | ...................... | H04J 3/247 |
| | | | | | 370/416 |

(Continued)

OTHER PUBLICATIONS

Rezaei, Mehdi et al. Joint Video Coding and Statistical Multiplexing for Broadcasting Over DVB-H Channels: IEEE Transactions on Multimedia, vol. 10, No. 8, Dec. 2008.

(Continued)

*Primary Examiner* — Mohamed Kamara
(74) *Attorney, Agent, or Firm* — Meagher Emanuel Laks Goldberg & Liao, LLP

(57) ABSTRACT

System and method for multiplexing data Di and one or more streams containing video data $D_{video}$ in a transmission channel with fixed bitrate comprising a multiplexer (11) and its controller (112), the multiplexer (11) comprising one to n inputs (11v) receiving the stream or streams $D_{video}$, a bitrate allocator (12), the multiplexer (11) comprises an input (11d) for the data Di to be multiplexed, and the said system comprises at least the following elements: a memory (20) receiving the data to be multiplexed with the stream or streams $D_{video}$, a bitrate estimator (21) which transmits a bitrate request Rd to the bitrate allocator (12), the bitrate request Rd is transmitted to the controller (112) of the multiplexer and delayed, the controller (112) is suitable for reading from the memory (20) the data Di to be multiplexed, up to compliance with the bitrate request Rd.

15 Claims, 2 Drawing Sheets

(51) Int. Cl.
*H04L 5/00* (2006.01)
*H04L 12/825* (2013.01)
*H04L 29/06* (2006.01)
*H04N 21/2365* (2011.01)

(56) References Cited

U.S. PATENT DOCUMENTS 6,782,006 B1 * 8/2004 Tanaka .................. H04H 20/30 370/468

2009/0254657 A1 * 10/2009 Melnyk ................... H04L 47/10 709/224
2010/0150168 A1 * 6/2010 Chatterjee .......... H04N 21/2365 370/465
2011/0235654 A1 9/2011 Jones et al.

OTHER PUBLICATIONS

Institut National De La Propriete Industrielle, Jan. 20, 2014—Search Report and Opinion.

* cited by examiner

SYSTEM AND METHOD FOR THE TRANSMISSION OF DATA AND STREAMS CONTAINING VIDEO DATA $D_{video}$ IN A CHANNEL WITH GIVEN BITRATE

CROSS REFERENCES TO RELATED APPLICATIONS

This application claims priority under 35 U.S.C. §119 to French patent application Number FR1357281, filed Jul. 24, 2013, the disclosure of which is incorporated herein by reference.

TECHNICAL FIELD

The subject of the invention relates to a method and a system for transmitting data in a transmission channel with given bitrate simultaneously with a set of streams containing video data $D_{video}$ and using statistical multiplexing. The invention applies in the case of video streams.

DISCUSSION ON PRIOR ART

The field of digital multimedia calls upon data compression schemes to enable the transmission of more services in one and the same bandwidth. It is thus possible to achieve a better compromise between on the one hand the quality of rendition and on the other hand the bitrate necessary to disseminate these data over a network.

It is thus known to use constant bitrate encoding techniques of CBR (Constant Bit Rate) type for data coding. The CBR mode generates a constant bitrate predefined by the user. The drawback of this mode is that the chosen target bitrate corresponds to the maximum bitrate necessary for the transmission of the most complex images. This results in poor use of the bandwidth for images of low complexities.

It is also known to use the variable bitrate or VBR (standing for Video Bit Rate) mode of coding, which makes it possible to preserve a predefined level of image quality whatever the complexity of a scene. The occupancy of the bandwidth of a transmission channel is thus better optimized.

Another way of proceeding is to apply statistical multiplexing in respect of a set of coders. This makes it possible to allot each coder a variable bitrate depending on the complexity of the image to be coded. Each coder sends a bitrate demand to a bitrate allocator which returns an instantaneous bitrate to the coders which depends on the set of demands of all the coders. The statistical multiplexing can be of the CBR type if the sum of the allocated bitrates is equal to the channel bitrate, or else be of the VBR type if the total bitrate is less than or equal to this channel.

The company Harmonic markets a device for multiplexing data with video streams.

The following letters will be used in the description:
Rc is the bitrate of the transmission channel, Re is the input bitrate of the data to be multiplexed, Rd is the bitrate request and the bitrate allotted to data to be multiplexed,
Rvj: bitrate allotted to a coder for video stream transmission, Rv the sum of the bitrates allotted to the set of coders, Qj a coder's bitrate demand,
Di the data to be multiplexed, $D_{video}$ the video data or video stream or stream containing video data.
The word "data" designates the data to be multiplexed with the video streams. The expression "video stream" designates a stream which comprises data included in a video service, video data, audio data, teletex, data for sub-titles or DVB-Subtitle, etc. The word coder designates the video coder.

SUMMARY OF THE INVENTION

The method according to the invention relies notably on the inserting of a data stream into a transmission channel with fixed bitrate intended mainly for the transport of signals arising from coders controlled by a statistical multiplexer.

The invention relates to a system for multiplexing data Di and one or more streams containing video data $D_{video}$ in a transmission channel with fixed bitrate comprising at least one configuration interface for the system, a multiplexer and its controller, the multiplexer comprising one to n inputs receiving the stream or streams containing video data $D_{video}$, a bitrate allocator, the system is characterized in that the multiplexer comprises an input for the data Di to be multiplexed, the said system comprises at least the following elements: a memory receiving the data to be multiplexed with the stream or streams containing video data $D_{video}$, a bitrate estimator which transmits a bitrate request Rd to the bitrate allocator, the bitrate request Rd is transmitted to the controller of the multiplexer and delayed, for example by a value ΔT, the controller is suitable for reading from the memory the data Di to be multiplexed, up to compliance with the bitrate request Rd.

The system can comprise one or more of the following modules
  a module for estimating bitrate of the data at input,
  a module for determining degree of occupancy of the memory by the data to be multiplexed,
  a module adapted for calculating the memory delay between the input data De and the output data Ds travelling across the memory,
the said module or modules transmitting information to the bitrate estimator module.

The system can comprise an element for instantaneous measurement of total bitrate Rt of the streams containing video data $D_{video}$ at the level of the controller of the multiplexer, a module of the controller receiving the measured total bitrate Rt of the streams containing video data $D_{video}$, the data Di bitrate request Rd, the channel bitrate Rc, the said module being suitable for calculating an opportunistic data bitrate Rdop equal to the channel bitrate minus the deterministic data bitrate minus the total bitrate of the video streams, Rdop=Rc−Rd−Rt.

The invention also relates to a method for simultaneously multiplexing data Di and one or more streams containing video data $D_{video}$ in a transmission channel with fixed bitrate Rc by using a system exhibiting one of the above characteristics, the method is characterized in that it comprises at least the following steps:
  a bitrate request Rd in respect of the data Di to be multiplexed according to a given configuration for the system is transmitted to a bitrate allocator,
  the request for bitrate Rd required is transmitted to the controller of the multiplexer and delayed by a delay value ΔT,
  the data to be multiplexed Di are read by the controller in a memory up to compliance with the bitrate request Rd, the data Di are transmitted to the multiplexer so as to be multiplexed with the stream or streams containing video data $D_{video}$.

The method can comprise a step of measuring at least one of the following parameters:

the bitrate of the data at input and/or the degree of occupancy of the memory by the data to be multiplexed, the memory delay between the input data De and the output data Ds travelling across the memory, the measurements being transmitted to the bitrate estimator module.

According to a variant embodiment, the total bitrate Rt of the streams containing video data $D_{video}$ is measured and a value of opportunistic data bitrate Rdop is calculated by taking account of the measured bitrate of the video stream and of the bitrate Rd of the deterministic data.

According to another variant embodiment a bitrate for the data to be multiplexed is reserved equal to the bitrate at input with a determined fixed delay.

According to another variant, a bitrate for the data to be multiplexed is reserved equal to the bitrate at input smoothed over a given constant duration.

It is also possible to determine the bitrate reserved for the data to be multiplexed as a function of the degree of filling of the memory.

According to another variant the bitrate reserved for the data to be multiplexed is chosen as a function of the measured delay of the data to be multiplexed in the memory. It is also possible to take account of the degree of fill of the memory and of the delay of the data.

The stream containing video data is a video stream.

BRIEF DESCRIPTION OF THE DRAWINGS

Other characteristics and advantages of the device according to the invention will be more apparent on reading the description which follows of an exemplary embodiment given by way of wholly nonlimiting illustration, together with the figures which represent.

DESCRIPTION OF EMBODIMENTS

Figure 1:
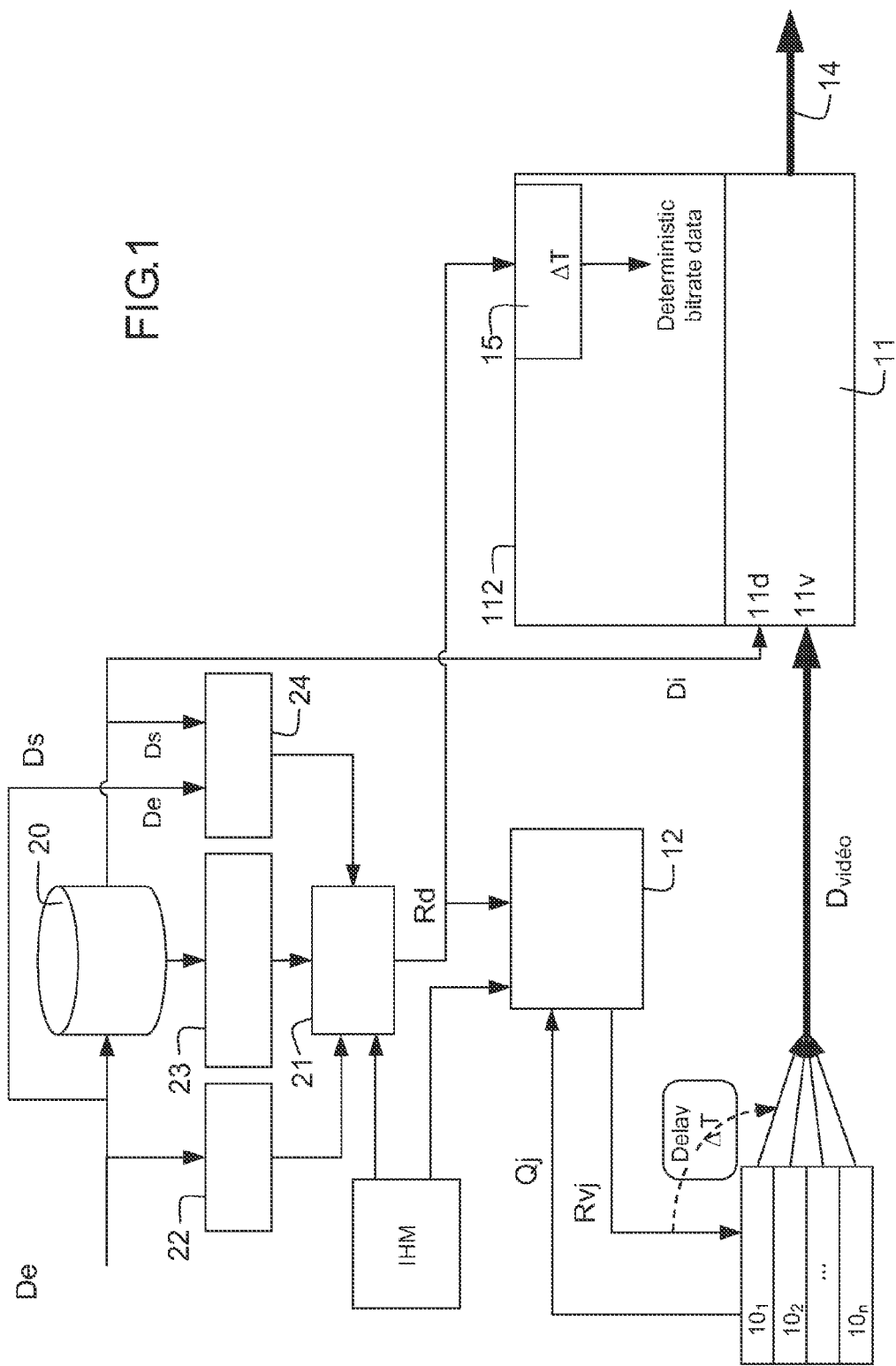
FIG. 1, a diagram of a first variant of the system according to the invention, and FIG. 2, a variant embodiment of FIG. 1 processing deterministic data and opportunistic data.

FIG. 1 shows diagrammatically an exemplary system according to the invention where the insertion of data into the output channel is of deterministic type. The bitrate allotted to the data is calculated on the basis of the data contained in a memory, said bitrate is perfectly mastered and is therefore called a deterministic bitrate. The bitrate is reserved by anticipation. The data are received for example in an MPEG format which is compatible with the format of the data arising from video coders.

The system comprises a Man Machine Interface (MMI) which will make it possible to configure the system.

The system comprises a set of video coders $10_1$, $10_2$, . . . $10_n$ in conjunction with a multiplexer 11 and its controller 112, and a bitrate allocator 12 whose function is notably to calculate the bitrate which will be allocated to each stream. The multiplexer 11 comprises n inputs 11v for the video streams $D_{video}$ and an additional input 11d of the data to be multiplexed Di.

The set of video coders 101, $10_2$, $10_n$ provides the compressed video streams and the associated components. Each video coder $10_1$, $10_2$, . . . $10_n$ makes a request Qj for bitrate to the bitrate allocator 12. In return the bitrate allocator 12 transmits the bitrate value Rvj which is allocated to a video coder to transmit the video data. The various video streams arising from the coders are transmitted, by an appropriate means, to the multiplexer 11 in charge of multiplexing them in the transmission channel 14. There exists a time or delay, noted ΔT, between the instant at which a video coder receives a bitrate order and the instant at which the bitrate is actually equal to this command.

The multiplexer 11 is adapted for multiplexing the data $D_i$ and the video data $D_{video}$. The function of its controller 112 is notably to control the transfer of the data Di between a memory 20 in which the data Di are stored and the input 11d of the multiplexer. The controller 112 will receive the bitrate requested Rd for the data Di, and it will carry out a transfer of data Di between the memory 20 and the input 11d of the multiplexer with a delay equal to ΔT so as to compensate for the delay of the video coders.

The memory 20 makes it possible to temporarily store the data Di to be multiplexed with the video streams in the transmission channel. The data will be inserted best into the transmission channel as a function of criteria related on the one hand to the configuration given by a user and, on the other hand, to the characteristics of the incoming video streams. The memory 20 is in conjunction with a bitrate estimator 21 which makes a bitrate request Rd to the allocator 12 of the multiplexer 11 in a manner similar to a video coder. The bitrate estimator 21 receives, for example, information from a module 22 for estimating bitrate of the data at input, and/or an item of information from a module 23 for calculating degree of occupancy of the memory by the data to be multiplexed. The bitrate estimator 21 is also in conjunction with a module 24 suitable for calculating the memory delay between the input data De and the output data Ds, i.e, the time taken by the data to travel across the memory.

The bitrate request Rd is dependent on the one hand on the system optimization desired by the user and, optionally, dependent on the other hand on several criteria which may be the input bitrate Re of the data, the degree of filling X of the memory 20 and/or the time Td resulting from the time taken by the data to cross the memory 20.

The bitrate request Rd is allotted by priority by the allocator 12 (the bitrate is imposed on the allocator). The allocator 12 will distribute between the video coders a bitrate Rv equal to the bitrate Rc of the transmission channel minus the bitrate allotted Rd to the data. There are therefore no losses in the data transmission.

The bitrate demand Rd is transmitted to the controller 112 of the multiplexer which will thus read from the memory 20, data Di up to compliance with the deterministic bitrate request in this example. The bitrate request Rd is delayed by ΔT in a delay module 15 so as to compensate for the delay taken by a video coder between the bitrate allocation and the actual presence of this bitrate at the output of the coder in such a way that all the bitrates (data bitrate, video streams bitrate) are in phase at the input of the multiplexer and avoid any under or over-bitrate at the output of the multiplexer.

The operation of the system in deterministic mode is explained hereinafter.

The user configures the mode of operation of the system as a function of the type of data that he wishes to multiplex with the video streams. Configuration is carried out through the man machine interface or MMI and software which configure the various blocks and modules described in the invention.

The reservation of bitrate in the output channel in the deterministic mode can be done, for example, according to five modes chosen by the user:

a so-called LAR mode in which the bitrate reserved for the data Di to be multiplexed at the output of the estimator of bitrate of the data to be multiplexed is equal to the bitrate at input with a fixed delay determined by the user, a LARsmoothed mode in which the bitrate reserved for the data Di to be multiplexed at the output of the bitrate estimator is equal to the bitrate at input, smoothed over a constant duration chosen by the user. More precisely, the smoothing technique consists, for example, in averaging the bitrates at input over a time span of fixed duration. The smoothing is all the greater the longer this time span, a memory mode in which the bitrate reserved for the data Di to be multiplexed at the output of the bitrate estimator is dependent on the memory filling, a temporal mode for which the bitrate reserved for the data Di to be multiplexed at the output of the bitrate estimator is dependent on the measured delay of the data to be multiplexed in the memory, a mixed mode resulting from the combination of the two modes, memory and temporal. The bitrate reservation is dependent on the memory filling, if it is too low, the data may take an excessive time to cross this memory. This defect is compensated for by combining the temporal mode with the memory mode.

Moreover, if the statistical multiplexing is of the VBR type, there exist instants at which the total bitrate Rt, that is to say the bitrate of the coders Rv plus the deterministic bitrate Rd, is less than the bitrate of the channel Rc, for example if several coders transmit a fixed image at the same instant. There is therefore an opportunity to add further data that will therefore be called opportunistic.

Figure 2:
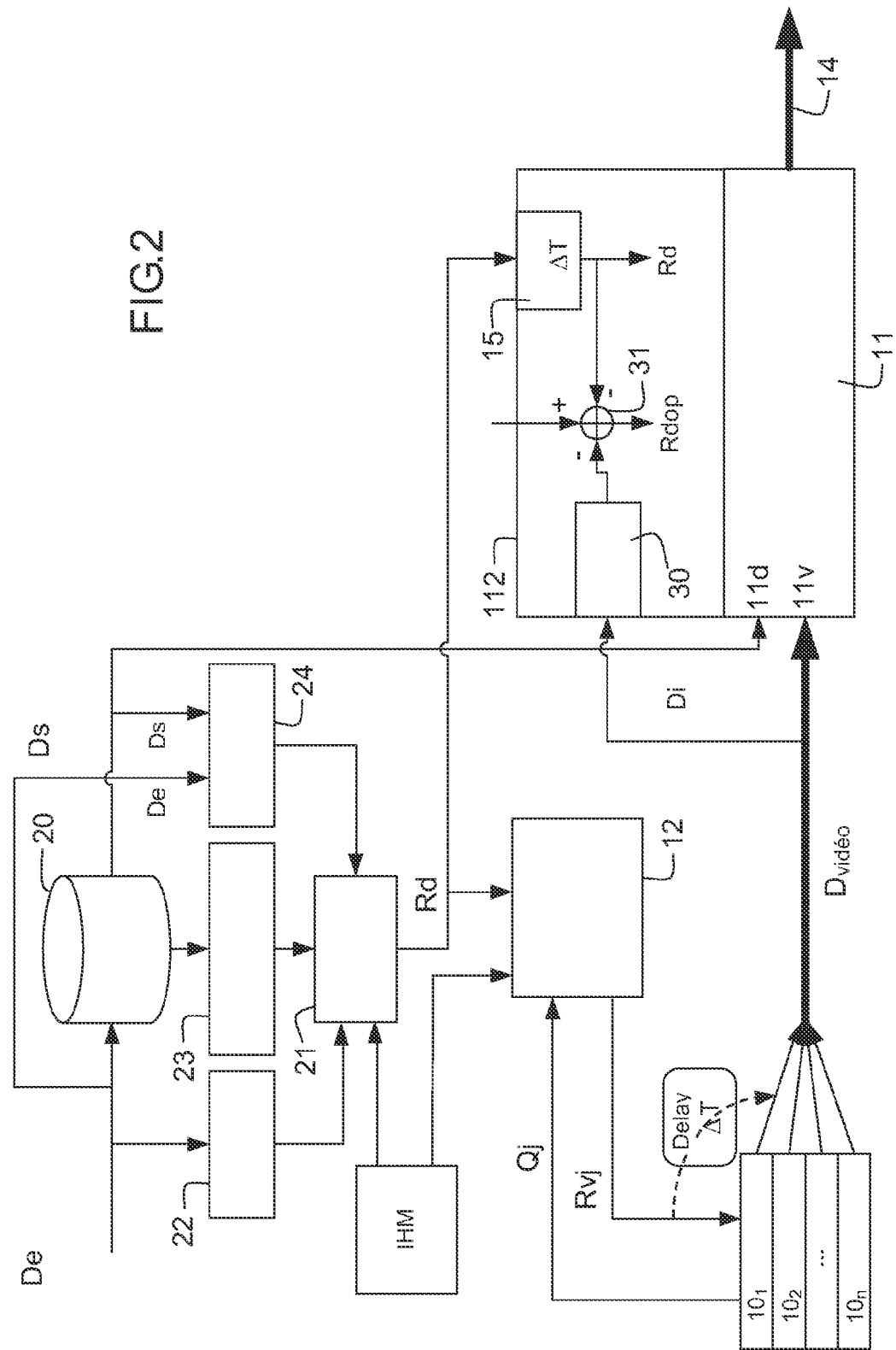

FIG. 2 shows diagrammatically a variant embodiment making it possible to optimize the transmission of data. An element 30 for instantaneous measurement of total bitrate Rt of the video streams is added at the level of the controller 112 of the multiplexer. A module 31 of the controller receives the value of the measured total bitrate Rt of the video streams, the data bitrate value Rd, the value of the channel bitrate Rc. The module 31 calculates an opportunistic data bitrate Rdop equal to the channel bitrate minus the deterministic data bitrate minus the total bitrate of the video streams, Rdop=Rc−Rd−Rt. The data Di to be multiplexed with the video stream correspond to the data Di according to a deterministic bitrate mode plus the data Diop with an opportunistic bitrate. The controller 112 of the multiplexer will read these data from memory 20 and transmit them to the input 11d of the multiplexer 11.

Depending on the type of data to be transmitted, the appropriate mode will be selected:

for priority data to be transmitted in a transparent manner, for example, video, the aforementioned LAR mode is chosen;

for interactive data of interactive television or iTV: the delay in the multiplexer must be mastered, then smoothed LAR mode will be employed;

in the case of non-priority data, the mixed mode is selected.

Without departing from the scope of the invention, the method can be applied for real-time data streams which are not video streams, but which contain video data.

In the case of a system operating with all the outputs of the coders at zero bitrate, so as to fill the entire channel, the method will multiplex several additional data pathways. A constraint in respect of the implementation of the method is that the sum of the instantaneous bitrates of all these pathways be less than the channel bitrate.

ADVANTAGES

The method and the system according to the invention exhibit notably the advantage of giving back bitrate to the video streams, according to a mode chosen as a function of the priority or non-priority character of the data on the video. They make it possible notably to insert these data according to several modes configurable by the user as a function of the priority or non-priority character of the data on the video. The modes of configuration explained above cover the entire range from the maximum priority to video (respectively data) to the minimum priority to video (respectively data) while guaranteeing lossless data transmission.

The invention claimed is:

1. A system for multiplexing data (Di) and one or more streams containing video data (Dvideo) in a transmission channel with fixed bitrate comprising:

at least one configuration interface;

a multiplexer and its controller, the multiplexer comprising one to n inputs for receiving the one or more streams containing video data (Dvideo) and an input for receiving the data (Di) to be multiplexed, a bitrate allocator;

a memo configured to receive the data (Di) to be multiplexed with the one or more streams containing video data (Dvideo); and a bitrate estimator configured to transmit a bitrate request (Rd) to the bitrate allocator, the bitrate request (Rd) is transmitted to the controller of the multiplexer, and the bitrate request (Rd) is delayed, wherein the controller is suitable for reading from the memory the data (Di) to be multiplexed, up to compliance with the bitrate request (Rd).

2. The system according to claim 1, wherein the system further comprises:

an input bitrate estimator of the data at input, a calculation algorithm for occupancy rate in memory of the data to be multiplexed, a calculation memory delay between the input data (De); and the output data (Ds) travelling across the memory.

3. The system according to claim 1 wherein the system further comprises:

an element for instantaneous measurement of a total bitrate (Rt) of the one or more streams containing video data (Dvideo) at the level of the controller of the multiplexer, a module of the controller for receiving the measured total bitrate (Rt) of the one or more streams containing video data (Dvideo), the data (Di), the bitrate request (Rd), a channel bitrate (Rc), the module being suitable for calculating an opportunistic data bitrate (Rdop) equal to the channel bitrate minus the deterministic data bitrate minus the total bitrate of the one or more streams containing the video data, Rdop=Rc−Rd−Rt.

4. The system according to claim 2 wherein the system further comprises:

an element for instantaneous measurement of a total bitrate (Rt) of the one or more streams containing video data (Dvideo) at the level of the controller of the multiplexer, a module of the controller for receiving the measured total bitrate (Rt) of the one or more streams containing video data (Dvideo), the data (Di), the bitrate request (Rd), a channel bitrate (Rc), the module being suitable for calculating an opportunistic data bitrate (Rdop) equal to the channel bitrate minus the deterministic data bitrate minus the total bitrate of the streams containing the video data, Rdop=Rc−Rd−Rt.

5. The system according to claim 1 wherein the one or more streams containing video data (Dvideo) are video streams.

6. A method for simultaneously multiplexing data (Di) and one or more streams containing video data (Dvideo) in a transmission channel with a fixed bitrate (Rc) comprises:
   transmitting a bitrate request (Rd) to a bitrate allocator in respect of the data (Di) to be multiplexed according to a given configuration;
   transmitting the bitrate request (Rd) to a controller of a multiplexer and the bitrate request (Rd) is delayed by a delay value (ΔT); and
   reading the data to be multiplexed (Di) by the controller in a memory up to compliance with the bitrate request (Rd), the data (Di) are transmitted to the multiplexer so as to be multiplexed with the one or more streams containing video data (Dvideo).

7. The method according to claim 6, wherein the method comprises measuring at least one of the following parameters:
   the bitrate of input data (De) at an input, a degree of occupancy of the memory by the data (Di) to be multiplexed, and a memory delay between the input data (De) and output data (Ds) travelling across the memory.

8. The method according to claim 6 wherein a total bitrate (Rt) of the one or more streams containing video data (Dvideo) is measured and a value of an opportunistic data bitrate (Rdop) is calculated by taking account of the measured total bitrate (Rt) of the one or more streams containing video data (Dvideo) and of a deterministic bitrate.

9. The method according to claim 6 wherein a total bitrate (Rt) of the one or more streams containing video data (Dvideo) is measured and a value of an opportunistic data bitrate (Rdop) is calculated by taking account of the measured bitrate (Rt) of the one or more streams containing video data (Dvideo) and of a deterministic bitrate.

10. The method according to claim 6 wherein a bitrate for the data (Di) to be multiplexed is reserved to be equal to a bitrate at an input with a determined fixed delay.

11. The method according to claim 6 wherein a bitrate for the data (Di) to be multiplexed is reserved to be equal to a bitrate at an input smoothed over a given constant duration.

12. The method according to claim 6 wherein a bitrate reserved for the data (Di) to be multiplexed is determined as a function of a degree of fill of the memory.

13. The method according to claim 6 wherein a bitrate reserved for the data (Di) to be multiplexed is chosen as a function of a measured delay of the data (Di) to be multiplexed in the memory.

14. The method according to claim 10 wherein the bitrate reserved for the data (Di) to be multiplexed is chosen as a function of a measured delay of the data (Di) to be multiplexed in the memory.

15. The method according to claim 6, wherein the one or more streams containing video data (Dvideo) are video data streams.

* * * * *